(12) United States Patent
Sugimura et al.

(10) Patent No.: US 6,983,101 B1
(45) Date of Patent: Jan. 3, 2006

(54) IMAGE RECORDING APPARATUS, IMAGE REPRODUCING APPARATUS AND IMAGE RECORDING/REPRODUCING APPARATUS

(75) Inventors: Yukio Sugimura, Suita (JP); Yoshiaki Maida, Shijyonawate (JP); Masanori Tokura, Daito (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/537,755

(22) Filed: Mar. 30, 2000

(30) Foreign Application Priority Data

| Mar. 31, 1999 | (JP) | 11-092529 |
| Mar. 31, 1999 | (JP) | 11-092530 |
| Mar. 31, 1999 | (JP) | 11-092531 |
| Mar. 31, 1999 | (JP) | 11-092532 |

(51) Int. Cl.
*H04N 5/91* (2006.01)
(52) U.S. Cl. ...................... 386/107; 385/117
(58) Field of Classification Search ................ 386/96, 386/95, 98, 107, 117, 111, 112; 348/153, 348/159; 375/240
See application file for complete search history.

(56) References Cited

U.S. PATENT DOCUMENTS

| 4,943,854 A | * | 7/1990 | Shiota et al. ............... 348/159 |
| 5,386,234 A | * | 1/1995 | Veltman et al. ......... 375/240.13 |
| 5,488,482 A | * | 1/1996 | Ueda et al. .................. 386/111 |
| 5,574,504 A | * | 11/1996 | Yagasaki et al. ....... 375/240.13 |
| 5,724,475 A | * | 3/1998 | Kirsten ....................... 386/109 |
| 5,915,040 A | * | 6/1999 | Yatomi et al. ............. 382/232 |
| 6,134,375 A | * | 10/2000 | Naganawa et al. ........... 386/33 |
| 6,137,835 A | * | 10/2000 | Yamashita et al. .......... 375/240 |
| 6,314,137 B1 | * | 11/2001 | Ono et al. ................. 375/240 |
| 6,600,872 B1 | * | 7/2003 | Yamamoto .................... 386/67 |

FOREIGN PATENT DOCUMENTS

| JP | 2-72780 A | 3/1990 |
| JP | 4-10788 A | 1/1992 |
| JP | 4-14974 A | 1/1992 |
| JP | 7-67068 A | 3/1995 |
| JP | 07-212699 A | 8/1995 |
| JP | 10-276365 A | 10/1996 |

\* cited by examiner

*Primary Examiner*—Huy Nguyen
(74) *Attorney, Agent, or Firm*—Arent Fox PLLC

(57) ABSTRACT

An image recording apparatus comprises means for storing in a memory input image data as basic image data in a period of a predetermined number of fields as well as feeding the input image data to image compression means, means for finding, with respect to each of the input image data corresponding to the fields between the field corresponding to the input image data which has been stored in the memory and the field corresponding to the input image data which is to be subsequently stored in the memory, the difference between the input image data and the basic image data which has been most newly stored in the memory, and feeding data representing the obtained difference to the image compression means, and means for recording on a recording medium compressed data for each field which has been compressed by the image compression means, together with identification indicating whether the compressed data corresponds to the basic image data or the difference data.

3 Claims, 16 Drawing Sheets

FIG. 7

| INDEX | ADDRESS IN WHICH FRAME HEADER IS STORED |
|---|---|
| 1 | xxxxh |
| 2 | xxxxh |
| 3 | xxxxh |
| 4 | xxxxh |
|  | xxxxh |
|  | xxxxh |
|  | xxxxh |
|  | xxxxh |
|  | xxxxh |
|  | xxxxh |
| 2024 | xxxxh |

FIG. 9

| INDEX NUMBER IN SUB-BANK | STORED DATA |
|---|---|
| 1 | I1 |
| 2 | P11 |
| 3 | P12 |
| 4 | P13 |
| 5 | I2 |
| 6 | P21 |
| 7 | P22 |
| 8 | P23 |
| 9 | I3 |
| 10 | P31 |
| 11 | P32 |
| 12 | P33 |

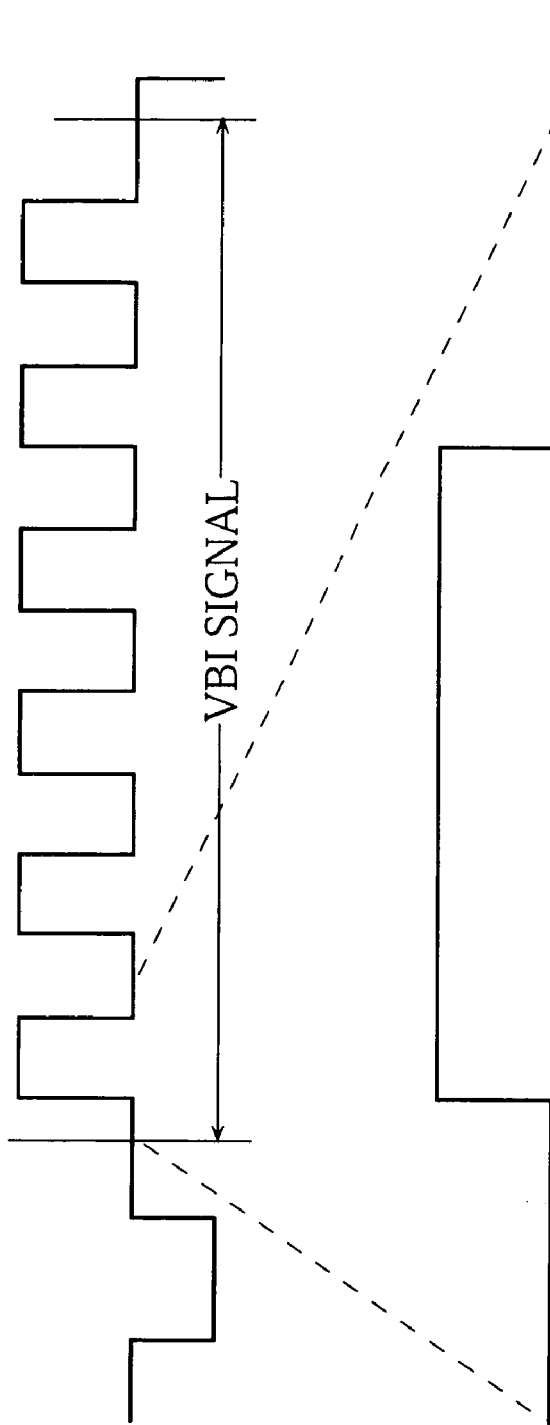
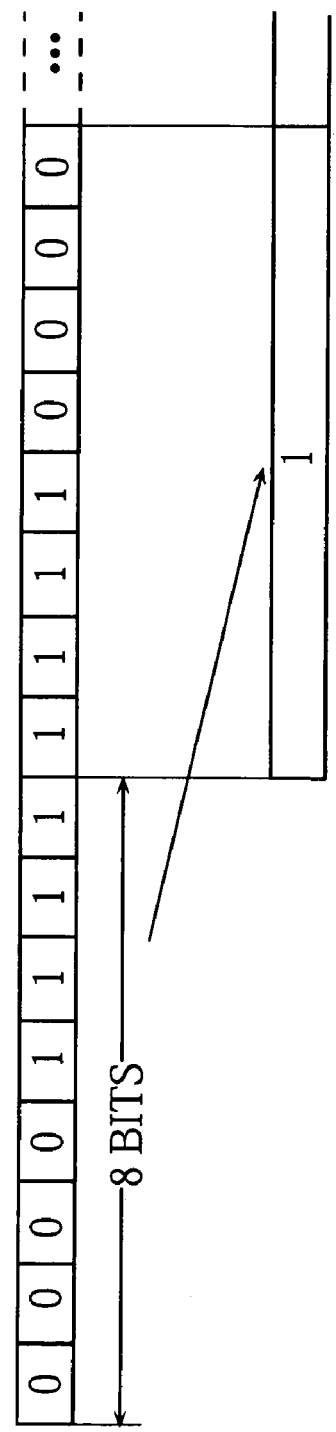
FIG. 12a
FIG. 12b
FIG. 12c
FIG. 12d

FIG. 13

| | | | | | | | | | | | |
|---|---|---|---|---|---|---|---|---|---|---|---|
| (a) INPUT IMAGE DATA | A1 | B1 | C1 | D1 | A2 | B2 | C2 | D2 | A3 | B3 | C3 | D3 |
| (b) CAMERA NUMBER | A | B | C | D | A | B | C | D | A | B | C | D |
| (c) DATA TO BE STORED IN MEMORY | A1 | B1 | C1 | D1 | A1 | B1 | C1 | D1 | A1 | B1 | C1 | D1 |
| (d) OUTPUT IMAGE DATA ((a)-(c)) | A1 | B1 | C1 | D1 | A2-A1 | B2-B1 | C2-C1 | D2-D1 | A3-A1 | B3-B1 | C3-C1 | D3-D1 |
| (d) I/P IDENTIFICATION INFORMATION | I | I | I | I | P | P | P | P | P | P | P | P |

IMAGE RECORDING APPARATUS, IMAGE REPRODUCING APPARATUS AND IMAGE RECORDING/REPRODUCING APPARATUS

BACKGROUND OF THE INVENTION

1. Field of the Invention

The present invention relates to an image recording apparatus, an image reproducing apparatus, and an image recording/reproducing apparatus.

2. Description of the Prior Art

An image recording/reproducing apparatus comprising a recording apparatus for compressing by an image compressing device an image picked up by a monitoring camera and recording obtained compressed data on a video tape and a reproducing apparatus for reading the compressed data which has been recorded on the video tape, expanding the read compressed data by an image expanding device, and outputting the expanded compressed data has already been developed.

Furthermore, an image recording/reproducing apparatus comprising a recording apparatus for compressing by an image compressing device a time division multiple image signal from a multiplexer for successively switching images picked up by a plurality of monitoring cameras for each field period and outputting the image selected by the switching and recording obtained compressed data on a video tape and a reproducing apparatus for reading the compressed data which has been recorded on the video tape, expanding the read compressed data by an image expanding device, and outputting the expanded compressed data to the multiplexer has already been developed.

In the latter image recording/reproducing apparatus, information such as a camera number indicating which of the monitoring cameras picks up an image in each of fields included in the time division multiple image signal is multiplexed as a VBI signal on a vertical blanking period in the field by the multiplexer. The VBI signal is also recorded on the video tape.

At the time of play, the image signal and the VBI signal which are recorded on the video tape are also reproduced. Only the reproduced image signal from the desired monitoring camera is selected and displayed on the basis of a camera number included in the VBI signal.

SUMMARY OF THE INVENTION

An object of the present invention is to provide an image recording apparatus, an image reproducing apparatus, and an image recording/reproducing apparatus which can reduce the amount of recorded data.

Another object of the present invention is to provide an image recording apparatus, an image reproducing apparatus, and an image recording/reproducing apparatus which can reduce the amount of recorded data corresponding to a VBI signal.

Still another object of the present invention is to provide, in an image recording/reproducing apparatus capable of easily detecting that an error occurs in data read from a video tape by a video head at the time of play, a method of detecting the error in the read data.

A further object of the present invention is to provide, in an image recording/reproducing apparatus capable of easily detecting that an error occurs in data read from a video tape by a video head at the time of play as well as preventing a field where the error occurs from being reproduced and outputted, a method of detecting the error in the read data.

A first image recording apparatus according to the present invention is characterized by comprising image compression means; means for storing in a memory input image data as basic image data in a period of a predetermined number of fields as well as feeding the input image data to the image compression means; means for finding, with respect to each of the input image data corresponding to the fields between the field corresponding to the input image data which has been stored in the memory and the field corresponding to the input image data which is to be subsequently stored in the memory, the difference between the input image data and the basic image data which has been most newly stored in the memory, and feeding data representing the obtained difference to the image compression means; and means for recording on a recording medium compressed data for each field which has been compressed by the image compression means, together with identification information indicating whether the compressed data corresponds to the basic image data or the difference data.

A first image reproducing apparatus according to the present invention is an image reproducing apparatus for reproducing the data which has been recorded on the recording medium by the above-mentioned first image recording apparatus, characterized by comprising means for reading the compressed data and the identification information from the recording medium; image expansion means for expanding for each field the compressed data which has been read from the recording medium and returning the expanded compressed data to the data which has not been compressed by the image compression means; means for judging whether the data for each field which has been expanded by the image expansion means is the basic image data or the difference data on the basis of the identification information; means for storing, when the data for each field which has been expanded by the image expansion means is the basic image data, the basic image data in the memory as well as outputting the basic image data as reproduced image data; and means for restoring, when the data for each field which has been expanded by the image expansion means is the difference data, the original image data on the basis of the difference data and the basic image data which has been most newly stored in the memory, and outputting the obtained image data as reproduced image data.

A first image recording/reproducing apparatus according to the present invention is characterized by comprising a recording apparatus and a reproducing apparatus, characterized in that the recording apparatus comprises image compression means, means for storing in a memory input image data as basic image data in a period of a predetermined number of fields as well as feeding the input image data to the image compression means, means for finding, with respect to each of the input image data corresponding to the fields between the field corresponding to the input image data which has been stored in the memory and the field corresponding to the input image data which is to be subsequently stored in the memory, the difference between the input image data and the basic image data which has been most newly stored in the memory, and feeding data representing the obtained difference to the image compression means, and means for recording on a recording medium compressed data for each field which has been compressed by the image compression means, together with identification information indicating whether the compressed data corresponds to the basic image data or the difference data, and the reproducing apparatus comprises means for reading the compressed data and the identification information from the recording medium, image expansion means for expanding for each field the compressed data which has been read from the recording medium and returning the expanded compressed data to the data which has not been compressed by the image compression means, means for judging whether the data for each field which has been expanded by the image expansion means is the basic image data or the difference data on the basis of the identification information, means for storing, when the data for each field which has been expanded by the image expansion means is the basic image data, the basic image data in the memory as well as outputting the basic image data as reproduced image data, and means for restoring, when the data for each field which has been expanded by the image expansion means is the difference data, the original image data on the basis of the difference data and the basic image data which has been most newly stored in the memory, and outputting the obtained image data as reproduced image data.

A second image recording apparatus according to the present invention is an image recording apparatus for recording on a recording medium a time division multiplex image signal obtained by subjecting image signals from a plurality of video cameras to time division multiplexing and having information relating to the camera numbers of the video cameras respectively corresponding to fields included therein added thereto, characterized by comprising storage means respectively provided in correspondence with the camera numbers; means for storing, for each group of fields assigned the same camera number which are included in the time division multiplex image signal, image data as basic image data in the storage means corresponding to the camera number assigned to the group of fields in a period of a predetermined number of fields as well as feeding the image data to the image compression means; means for finding, in each group of fields assigned the same camera number which are included in the time division multiplex image signal, the difference between each of the image data corresponding to the fields between the field corresponding to the image data which has been stored in the storage means corresponding to the camera number assigned to the group of fields and the field corresponding to the image data which is to be subsequently stored in the corresponding storage means and the basic image data which has been most newly stored in the corresponding storage means, and feeding data representing the obtained difference to the image compression means; and means for recording on a recording medium each of compressed data for each field which have been compressed by the image compression means, together with identification information indicating whether the compressed data corresponds to the basic image data or the difference data and the camera number.

A second image reproducing apparatus according to the present invention is an image reproducing apparatus for reproducing the data which has been recorded on the recording medium by the above-mentioned second image recording apparatus, characterized by comprising means for reading the compressed data, the identification information, and the camera number from the recording medium; image expansion means for expanding for each field the compressed data which has been read from the recording medium and returning the expanded compressed data to the data which has not been compressed by the image compression means; means for judging whether the data for each field which has been expanded by the image expansion means is the basic image data or the difference data on the basis of the identification information; means for storing, when the data for each field which has been expanded by the image expansion means is the basic image data, the basic image data in the storage means corresponding to the camera number corresponding to the basic image data as well as outputting the basic image data as reproduced image data; and means for restoring, when the data for each field which has been expanded by the image expansion means is the difference data, the original image data on the basis of the difference data and the basic image data which has been most newly stored in the storage means corresponding to the camera number corresponding to the difference data, and outputting the obtained image data as reproduced image data.

A second image recording/reproducing apparatus according to the present invention is an image recording/reproducing apparatus comprising a recording apparatus for recording on a recording medium a time division multiplex image signal obtained by subjecting image signals from a plurality of video cameras to time division multiplexing and having information relating to the camera numbers of the video cameras respectively corresponding to fields included therein added thereto, and a reproducing apparatus for reproducing the data which has been recorded on the recording medium, characterized in that the recording apparatus comprises storage means respectively provided in correspondence with the camera numbers, means for storing, for each group of fields assigned the same camera number which are included in the time division multiplex image signal, image data as basic image data in the storage means corresponding to the camera number assigned to the group of fields in a period of a predetermined number of fields as well as feeding the image data to the image compression means, means for finding, in each group of fields assigned the same camera number which are included in the time division multiplex image signal, the difference between each of the image data corresponding to the field between the field corresponding to the image data which has been stored in the storage means corresponding to the camera number assigned to the group of fields and the field corresponding to the image data which is to be subsequently stored in the corresponding storage means and the basic image data which has been most newly stored in the corresponding storage means, and feeding data representing the obtained difference to the image compression means, and means for recording on a recording medium each of compressed data for each field which have been compressed by the image compression means, together with identification information indicating whether the compressed data corresponds to the basic image data or the difference data and the camera number, and the reproducing apparatus comprises means for reading the compressed data, the identification information, and the camera number from the recording medium, image expansion means for expanding for each field the compressed data which has been read from the recording medium and returning the expanded compressed data to the data which has not been compressed by the image compression means, means for judging whether the data for each field which has been expanded by the image expansion means is the basic image data or the difference data on the basis of the identification information, means for storing, when the data for each field which has been expanded by the image expansion means is the basic image data, the basic image data in the storage means corresponding to the camera number corresponding to the basic image data as well as outputting the basic image data as reproduced image data, and means for restoring, when the data for each field which has been expanded by the image expansion means is the difference data, the original image data on the basis of the difference data and the basic image data which has been most newly stored in the storage means corresponding to the camera number corresponding to the difference data, and outputting the obtained image data as reproduced image data.

A third image recording apparatus according to the present invention is an image recording apparatus for recording on a recording medium an image signal having a predetermined VBI signal multiplexed on a vertical blanking period in each of fields included therein, characterized by comprising AD conversion means for converting the image signal into digital image data; VBI separation and coding means for separating for each field VBI data from the digital image data as well as coding the separated VBI data to produce coded VBI data; image data compression means for compressing for each field the image data from which the VBI data has been separated; coded VBI data addition means for adding to the compressed image data corresponding to each of the fields which has been obtained by the image data compression means the coded VBI data corresponding to the field; and recording means for recording on the recording medium the compressed image data to which the coded VBI data has been added by the coded VBI data addition means.

A third image reproducing apparatus according to the present invention is an image reproducing apparatus for reproducing the data which has been recorded on the recording medium by the above-mentioned third image recording apparatus, characterized by comprising means for reading from the recording medium the compressed image data to which the coded VBI data has been added; VBI separation and coding means for separating the coded VBI data from the compressed image data which has been read from the recording medium as well as decoding the separated coded VBI data, to produce VBI data; image data expansion means for expanding for each field the compressed image data from which the coded VBI data has been separated; VBI data addition means for adding to the image data corresponding to each of the fields which has been obtained by the image data expansion means the VBI data corresponding to the field; and DA conversion means for converting the image data to which the VBI data has been added by the VBI data addition means into an analog image signal.

A third image recording/reproducing apparatus according to the present invention is an image recording/reproducing apparatus comprising a recording apparatus for recording on a recording medium an image signal having a predetermined VBI signal multiplexed on a vertical blanking period in each of fields included therein, and a reproducing apparatus for reproducing data which has been recorded on the recording medium, characterized in that the recording apparatus comprises AD conversion means for converting the image signal into digital image data, VBI separation and coding means for separating for each field VBI data from the digital image data as well as coding the separated VBI data to produce coded VBI data, image data compression means for compressing for each field the image data from which the VBI data has been separated, coded VBI data addition means for adding to the compressed image data corresponding to each of the fields which has been obtained by the image data compression means the coded VBI data corresponding to the field, and recording means for recording on the recording medium the compressed image data to which the coded VBI data has been added by the coded VBI data addition means, and the reproducing apparatus comprises means for reading from the recording medium the compressed image data to which the coded VBI data has been added, VBI separation and coding means for separating the coded VBI data from the compressed image data which has been read from the recording medium as well as decoding the separated coded VBI data, to produce VBI data, image data expansion means for expanding for each field the compressed image data from which the coded VBI data has been separated, VBI data addition means for adding to the image data corresponding to each of the fields which has been obtained by the image data expansion means the VBI data corresponding to the field, and DA conversion means for converting the image data to which the VBI data has been added by the VBI data addition means into an analog image signal.

An example of the VBI separation and coding means is one comprising means for separating the VBI data from the image data for each field, first VBI data compression means for slicing the separated VBI data at a predetermined level, to compress the VBI data in the bit direction, and second VBI data compression means for averaging for each predetermined number of data the compressed VBI data obtained by the first VBI data compression means, and compressing the averaged compressed VBI data in the time axis direction.

A read data error detecting method in an image recording/reproducing apparatus according to the present invention is a read data error detecting method in an image recording/reproducing apparatus for reading, at the time of play, data for each block including a plurality of fields from a recording medium to store the data in a memory, and then successively reading out the data in the block from the memory to perform play processing, characterized in that the data for each field which is recorded on the recording medium includes a frame header which is inserted into a position at the head of the data corresponding to the field, at least one error detecting header which is inserted into a position spaced a predetermined number of words apart from the frame header and/or a position where the number of words from the frame header can be previously specified before data at the position is stored in the memory, and an end code which is inserted into the final position of the data corresponding to the field, and by further comprising the step of confirming the frame header from the data read from the recording medium when the data read from the recording medium is stored in the memory at the time of play, starting, when the frame header is detected, to count the number of words, confirming, when the counted number of words corresponds to the position where the predetermined error detecting header is inserted, whether or not the error detecting header exists, and judging that an error occurred if the error detecting header cannot be confirmed.

It is preferable to return, when it is judged that the error occurred, a pointer to an address in the memory in which an end code in the field preceding the field where it is judged that the error occurred is written, stop, until a frame header in the field succeeding the field where it is judged that the error occurred is sent, the writing of data into the memory, and start, when a frame header in the field succeeding the field where it is judged that the error occurred, to write the data corresponding to the field upon advancing the pointer by one position.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a schematic view showing the contents of a sub-bank;

FIG. 9 is a schematic view showing data which have been normally reproduced out of data in a block which have been normally reproduced immediately before the time point where a reverse play command is entered and index numbers corresponding thereto;

FIGS. 12a, 12b, 12c, and 12d are schematic views for explaining a method of coding VBI data by a VBI information separating/coding unit;

FIG. 13 is a timing chart showing the operation at the time of recording of a difference block;

DETAILED DESCRIPTION OF THE PREFERRED EMBODIMENTS

[A] Description of First Embodiment

Referring now to FIGS. 1 to 9, description is made of an embodiment in a case where the present invention is applied to a digital VTR for recording and reproducing an image picked up by one monitoring camera.

[1] Description of Overall Configuration of Monitoring System

Figure 1:
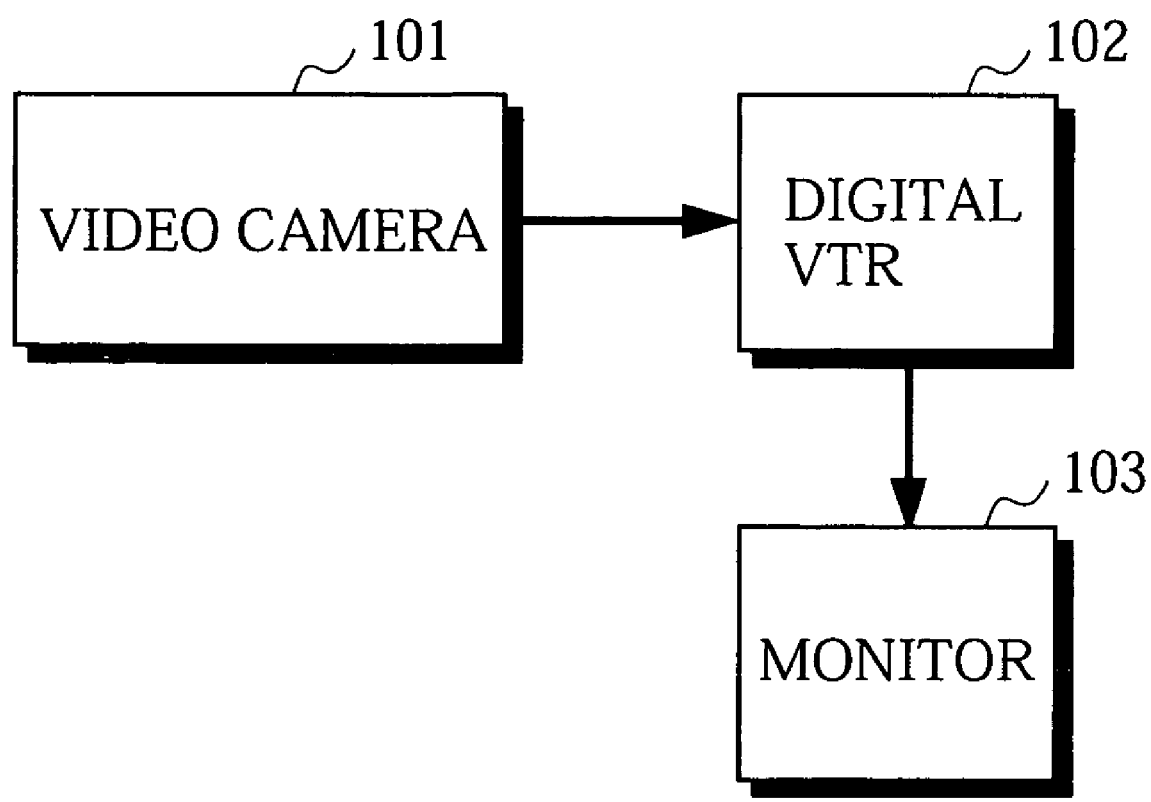
FIG. 1 is a block diagram showing the configuration of a monitoring system according to a first embodiment of the present invention.

FIG. 1 illustrates the overall configuration of a monitoring system.

The monitoring system comprises a video camera (hereinafter referred to as a monitoring camera) 101, a digital VTR 102 for compressing and recording an image signal obtained by the monitoring camera 101, and a monitor 103 for displaying an image reproduced by the digital VTR 102.

Figure 2:
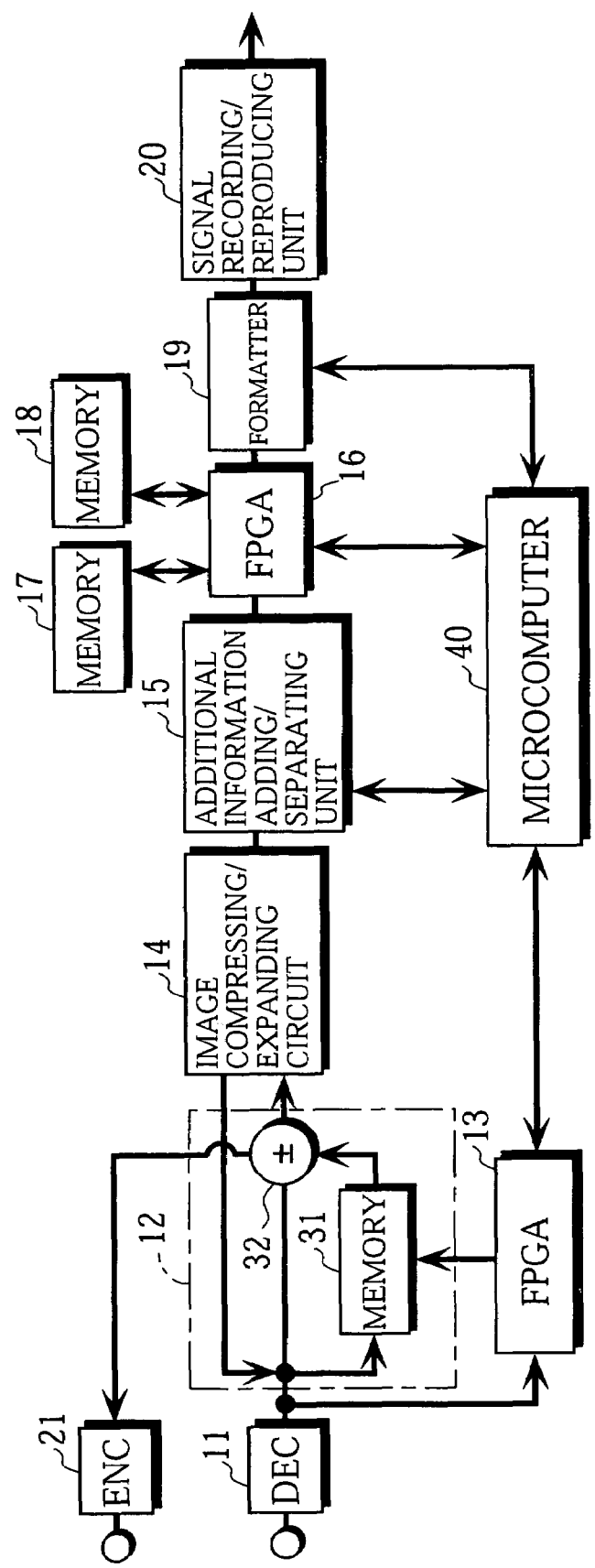
FIG. 2 is a block diagram showing the schematic configuration of a digital VTR.

[2] Description of Operation at the Time of Recording of Image Signal Processing Circuit in Digital VTR 102 FIG. 2 illustrates the configuration of an image signal processing circuit in the digital VTR 102. Description is made of the operation at the time of recording of the image signal processing circuit.

At the time of recording, an analog image signal fed from the monitoring camera 101 is converted into digital image data by a decoder 11. The image data obtained by the decoder 11 is fed to a difference block 12. The difference block 12 comprises a memory 31 and addition/subtraction means 32. The memory 31 is controlled by a first FPGA (Field Programmable Gate Array) 13.

Figure 3:
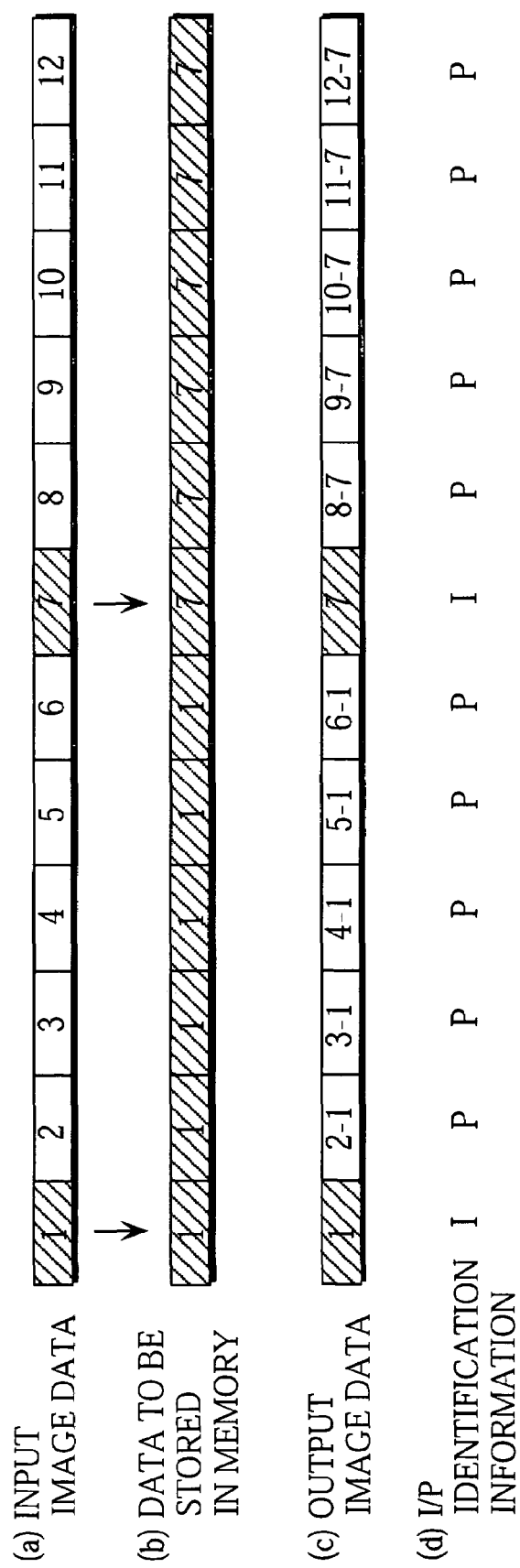
FIG. 3 is a timing chart showing the operation at the time of recording of a difference block.

FIG. 3 illustrates the operation at the time of recording of the difference block 12. In FIG. 3, a reference numeral denotes a field number.

The first FPGA 13 stores the image data outputted from the decoder 11 as basic image data in the memory 31 in a period of a predetermined number of fields (in this example, in a period of six vertical periods), and feeds the image data to an image compressing/expanding circuit 14 through the addition/subtraction means 32.

Each of the image data corresponding to the fields between the field corresponding to the image data which has been stored in the memory 31 and the field corresponding to the image data which is to be subsequently stored in the memory 31 is fed to the addition/subtraction means 32, the difference between the fed image data and the basic image data which is stored in the memory 31 is found, and data representing the found difference is fed to the image compressing/expanding circuit 14.

In the example shown in FIG. 3, image data "1" and "7" corresponding to field numbers "1" and "7" are stored in the memory 31, and are fed to the image compressing/expanding circuit 14. Each of image data "2" to "6" corresponding to field numbers between the field numbers "1" and "7" is fed to the addition/subtraction means 32, the difference between the fed image data and the basic image data "1" which is stored in the memory 31 is found, and data representing the found difference is fed to the image compressing/expanding circuit 14. Image data (basic image data) which has been fed to the image compressing/expanding circuit 14 through the addition/subtraction means 32 is called I image data, and data (difference data) which has been fed to the image compressing/expanding circuit 14 after the difference thereof from the basic image data was found by the addition/subtraction means 32 is called P image data.

In the image compressing/expanding circuit 14, the image data fed from the difference block 12 is compressed by a JPEG (Joint Photographic Experts Group) system, for example, for each field. Compressed image data (coded data) obtained by the image compressing/expanding circuit 14 is fed to an additional information adding/separating unit 15.

On the other hand, a microcomputer 40 acquires, from the first FPGA 13, I/P identification information indicating whether the compressed image data fed to the additional information adding/separating unit 15 is I image data or P image data, and feeds the acquired I/P identification information, together with recording time information (information relating to the current year, month, day, minute, and second) and the like, to the additional information adding/separating unit 15.

In the additional information adding/separating unit 15, the additional information such as the I/P identification information and the recording time information which corresponds to the compressed image data fed from the microcomputer 40 is added to the compressed image data obtained by the image compressing/expanding circuit 14. The data to which predetermined data has been added by the additional information adding/separating unit 15 is fed to a second FPGA 16.

The second FPGA 16 alternately writes the data fed from the additional information adding/separating unit 15 into two memories 17 and 18 for each predetermined block including data corresponding to a plurality of fields, reads out, every time data corresponding to one block are written into the memory, the data from the memory into which the data corresponding to one block have been written, and feeds the data read out to a formatter 19. One block is composed of data corresponding to 288 tracks, including information relating to an audio in this example.

Specifically, the second FPGA 16 writes the data fed from the additional information adding/separating unit 15 into one of the memories, for example, the first memory 17. When the data corresponding to one block have been written into the first memory 17, the memory into which the data are to be written is switched to the other second memory 18 and at the same time, the reading of the data from the first memory 17 is started.

The data read out of the first memory 17 is fed to the formatter 19. When the data corresponding to one block have been read out of the first memory 17, the reading is stopped.

Thereafter, when the data corresponding to one block have been written into the second memory 18, the memory into which the data are to be written is switched to the first memory 17 and at the same time, the reading of the data from the second memory 18 is started. The data read out of the second memory 18 is fed to the formatter 19. When the data corresponding to one block have been read out of the second memory 18, the reading is stopped. Thereafter, the same processing is repeated.

In the formatter 19, the fed data is converted into data having a data structure which can be recorded on a video tape. The data obtained by the formatter 19 is recorded on the video tape through a recording amplifier and a video head inside a signal recording/reproducing unit 20. That is, image data are recorded basically for each block (corresponding to 288 tracks) on the video tape. Every time the recording of the data for each block is terminated, the video tape is stopped.

The second FPGA 16 and the formatter 19 are controlled by the microcomputer 40.

Figure 4:
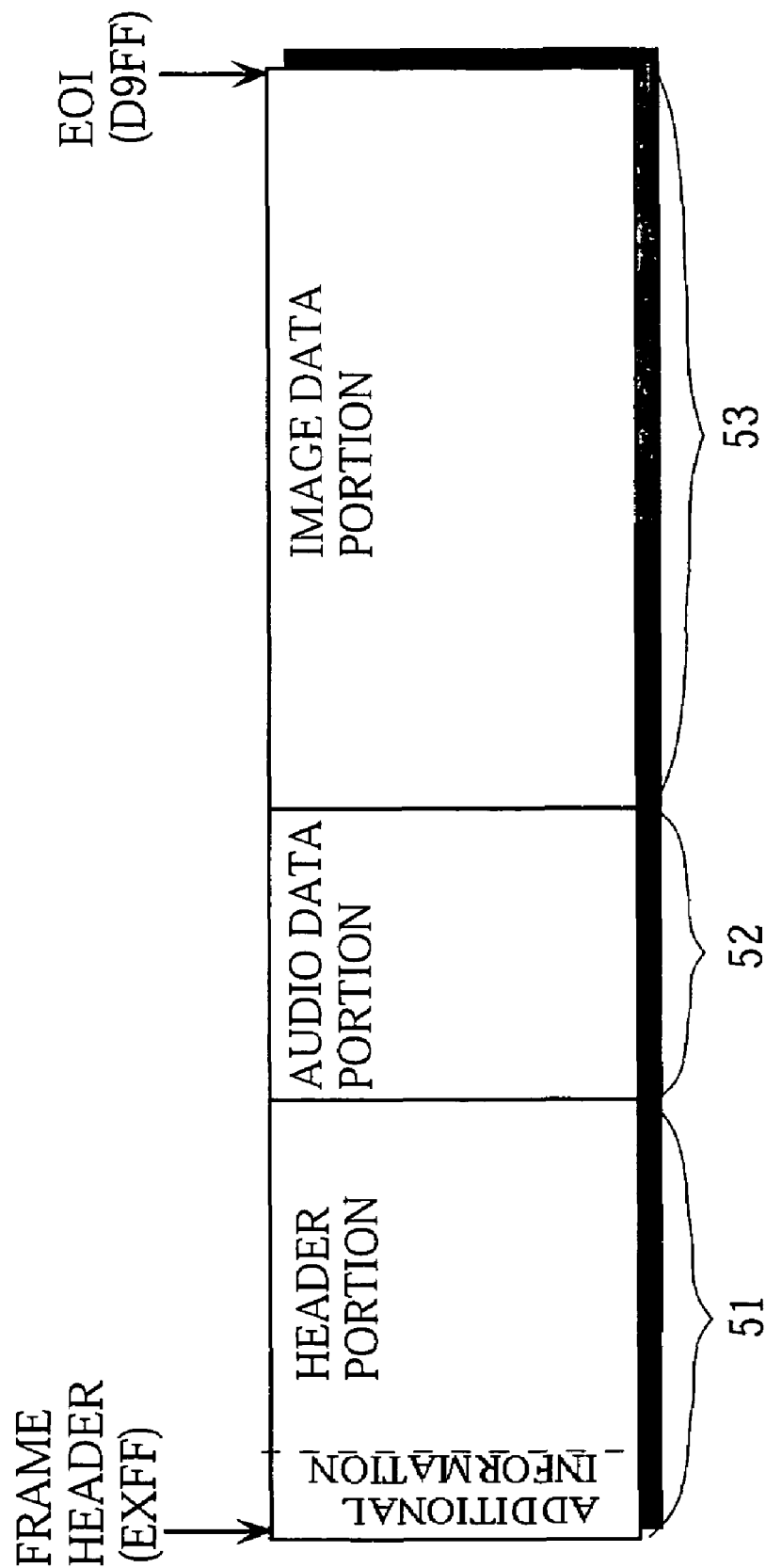
FIG. 4 is a schematic view showing a format for data corresponding to one field which is recorded on a video tape.

FIG. 4 illustrates a format for data corresponding to one field which is recorded on the video tape.

A data block corresponding to one field comprises a header portion 51, an audio data portion 52, and an image data portion 53.

The header portion 51 includes additional information such as I/P identification information and recording time information (year, month, day, hour, minute, and second), a quantization table (Q table), voice added data, and so forth. An example of the I/P identification information is "EXFFh", which is inserted as a frame header into the head of the header portion 51. "h" in "EXFFh" indicates that "EXFF" is a hexadecimal number. An image in the image data portion 53 is an I image if "X" in "EXFF" is zero, while being a P image if it is one. An end code (EOI; for example, "D9FFh") indicating the end of the image data portion 53 is inserted into the end of the image data portion 53.

[3] Description of Video Head Clogging Check Performed at the Time of Recording

As described above, at the time of recording, every time data corresponding to one block are written into the video tape, the video tape is stopped. However, a video head clogging check is performed utilizing a time period during which the video tape is stopped. Description is now made of a case where two video heads are provided opposite to each other through an angle of 180° in a recording drum.

Figure 5:
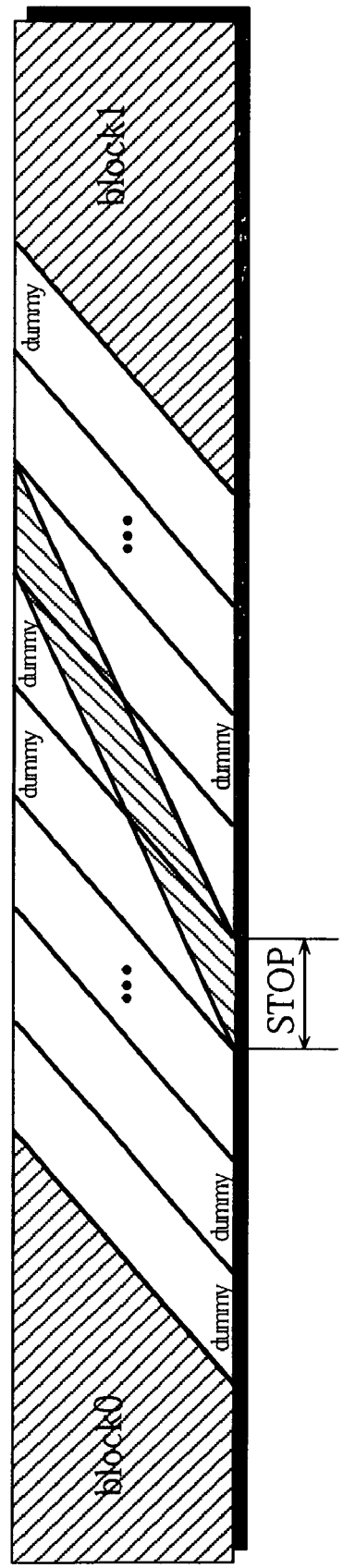
FIG. 5 is a schematic view showing the timing of performing a head clogging check.

As shown in FIG. 5, when data corresponding to one block (data corresponding to block0 in FIG. 5) are recorded on the video tape, dummy data corresponding to six tracks are recorded, and the video tape is then stopped. A check for clogging of each of the video heads is performed in the stopped state. When the clogging check is terminated, the video tape is caused to wait, allowing slight slack, by rotating a capstan in the opposite direction by only a predetermined amount in order to prevent the video tape from being damaged. Thereafter, at the timing of recording data corresponding to the subsequent block (data corresponding to block1 in FIG. 5), dummy data corresponding to a predetermined number of tracks are first recorded, and the recording of the data corresponding to the subsequent block on the video tape is then started.

Figure 6:
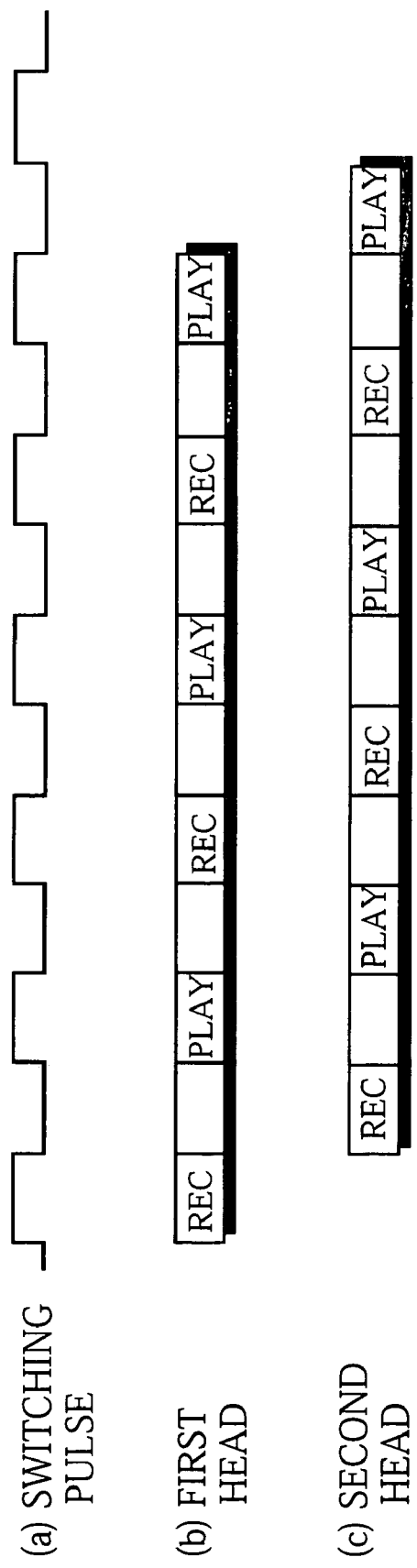
FIG. 6 is a timing chart for explaining a head clogging check performed when a video tape is stopped.

The check for clogging of each of the video heads is performed in the following manner. As shown in FIG. 6, recording and play of a test pattern are performed three times per head in a state where the video tape is stopped. The recording timing and the play timing of the test pattern for each of the video heads are controlled on the basis of a switching pulse, as shown in FIG. 6.

The microcomputer 40 calculates the sum of head outputs at the time of play performed three times for each of the video heads, and judges, when the sum is not more than a predetermined value (for example, not more than one-fourth a normal value), that the video head is clogged. The microcomputer 40 stops, when it judges that either one of the video heads is clogged, recording, and reports that the recording is stopped.

[4] Description of Operation at the Time of Play of Image Signal Processing Circuit At the time of play, data are read for each block from the video tape by the video head inside the signal recording/reproducing unit 20. The read image data are fed to the second FPGA 16 through a reproducing amplifier inside the signal recording/reproducing unit 20 and the formatter 19.

The second FPGA 16 alternately writes the fed data into the two memories 17 and 18 for each block, reads out, every time the data corresponding to one block are written into the memory, the data from the memory into which the data corresponding to one block have been written, and feeds the data read out to the additional information adding/separating unit 15.

The second FPGA 16 produces, when it writes the data fed from the formatter 19 into the memories 17 and 18, a sub-bank representing an address in which a frame header at the head of data corresponding to each field is stored is prepared in the memory, as shown in FIG. 7, such that a data write address can be recognized for the field.

In the additional information adding/separating unit 15, the additional information such as I/P identification information and time information is separated from the fed data corresponding to one field. The data from which the additional information has been separated is fed to the first FPGA 13 through the microcomputer 40.

Data from which predetermined data has been separated by the additional information adding/separating unit 15 is expanded for each field upon being fed to the image compressing/expanding circuit 14. Image data obtained by the image compressing/expanding circuit 14 is fed to the difference block 12.

Figure 8:
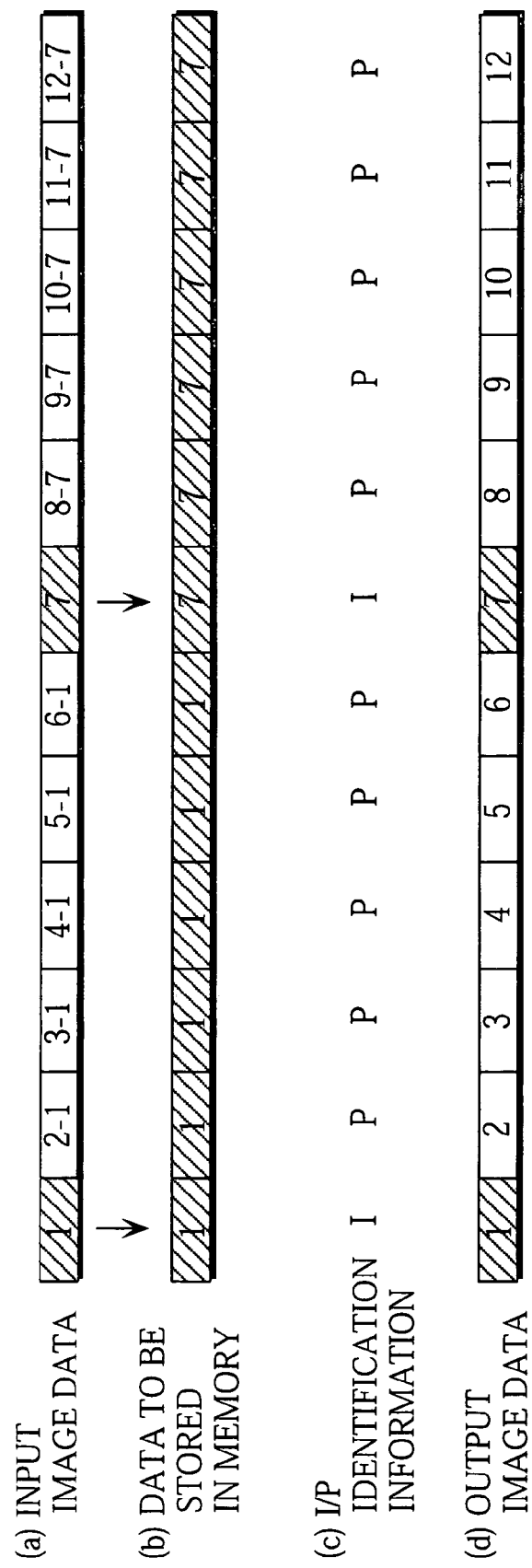
FIG. 8 is a timing chart showing the operation at the time of play of the difference block.

FIG. 8 illustrates the operation at the time of play of the difference block 12.

The first FPGA 13 judges whether an image inputted to the difference block 12 is an I image or a P image on the basis of the I/P identification information fed from the microcomputer 40.

When the image inputted to the difference block 12 is the I image, image data representing the I image is stored in the memory 31, and is fed to an encoder 21 through the addition/subtraction means 32. When the image inputted to the difference block 12 is the P image, data representing the P image (difference data) is fed to the addition/subtraction means 32, to find the sum of the P image data and the I image data (basic image data) which has been most newly stored in the memory 31. Obtained image data is fed to the encoder 21.

In the example shown in FIG. 8, I image data "1" and "7" are stored in the memory 31, and are fed to the encoder 21. Further, each of P image data "2-1", "3-1", . . . "6-1", "8-7", etc. is added to the I image data which has been most newly stored in the memory 31, to be returned to its original image data. Thereafter, the original image data is then fed to the encoder 21.

In the encoder 21, the fed image data is returned to an analog image signal, and the analog image signal is then fed to the monitor 103.

[5] Description of Special Play

[5-1] Description of Operations at the Time of Reverse Play

Description is made of operations in a case where a reverse play command is entered into the microcomputer 40 while normal play is being performed.

In the following description, an I/P group shall refer to a group comprising an arbitrary I image and P images whose difference from the I image is found.

At the time point where the reverse play command is entered into the microcomputer 40, data corresponding to one block (288 tracks) which have been normally reproduced immediately before the time point are stored in the first memory 17 or the second memory 18. The I image in the I/P group which has been reproduced immediately before the time point where the reverse play command is entered into the microcomputer 40 is stored in the memory 31 in the difference block 12.

For convenience of illustration, it is assumed that at the time point where the data corresponding to 12 fields corresponding to the index numbers 1 to 12 in the sub-bank (see FIG. 7) are normally reproduced, as shown in FIG. 9, out of the data corresponding to one block stored in the first memory 17, the reverse play command is entered into the microcomputer 40. In FIG. 9, I indicates an I image, and P indicates a P image. I1 and P11, P12 and P13 constitute the same I/P group, I2 and P21, P22 and P23 constitute the same I/P group, and I3 and P31, P32 and P33 constitute the same I/P group.

At the time of reverse play, the data corresponding to the index numbers 12, 11, 10, . . . 2, 1 must be reproduced in this order. In each of the I/P groups, however, the P image cannot be reproduced unless the I image is previously reproduced. At the time of reverse play, the second FPGA 16, the microcomputer 40, and the first FPGA 13 carry out the following control.

① The I/P group (I3, P31, P32, P33) which should be first reproduced is first reproduced by reverse play. Specifically, when the reverse play command is entered, the I image (I3) corresponding to the index number 9 is stored in the memory 31 in the difference block 12. Accordingly, the P images P33, P32, and P31 are reproduced in this order on the basis of the data I3 stored in the memory 31. Thereafter, the I image I3 is reproduced. Consequently, the image data corresponding to the index numbers 12 to 9 are reproduced in the opposite direction.

② Only respective additional information in the image data corresponding to the index numbers 8 to 5 are reproduced in the order of decreasing number, to acquire the index number 5 corresponding to the I image 12 in the I/P group (I2, P21, P22, P23) which should be subsequently reproduced on the basis of I/P identification information included in the additional information.

③ The I image (I2) corresponding to the index number 5 is reproduced. Consequently, the reproduced I image (I2) is stored in the memory 31 in the difference block 12. However, the reproduced I image is controlled so as not to be outputted from the difference block 12.

④ The I/P group (I2, P21, P22, P23) composed of the image data corresponding to the index numbers 5 to 8 is reproduced by reverse play, as in the item ①. ⑤ Only respective additional information in the image data corresponding to the index numbers 4 to 1 are reproduced in the order of decreasing number, to acquire the index number 1 corresponding to the I image I1 in the I/P group (I1, P11, P12, P13) which should be subsequently reproduced on the basis of I/P identification information included in the additional information.

⑥ The I image (I1) corresponding to the index number 1 is reproduced. Consequently, the reproduced I image (I1) is stored in the memory 31 in the difference block 12. However, the reproduced I image is controlled so as not to be outputted from the difference block 12.

⑦ The I/P group (I1, P11, P12, P13) composed of the image data corresponding to the index numbers 1 to 4 is reproduced by reverse play, as in the item ①. In the above-mentioned manner, the data which has been normally reproduced at the time point where the reverse play command is entered into the microcomputer 40 and the preceding data out of the data corresponding to one block which have been normally reproduced at the time point where the reverse play command is entered into the microcomputer 40 are reproduced in the opposite direction.

At the time of reverse play, the data are read for each block in the order reverse to the order recorded, contrary to that at the time of normal play. When data in a block preceding the block including the data which have been reproduced in the opposite direction in the above-mentioned manner are stored in the memory different from the memory in which the data which have been reproduced in the opposite direction are stored out of the memories 17 and 18, the data in the block are reproduced in the opposite direction by the same processing as the processing in the item ② and the subsequent items.

[5-2] Description of Operations at the Time of Forward Play

At the time of forward play, data read from the video tape are alternately stored for each block in the memories 17 and 18, as at the time of normal play. At the time of forward play, however, only data corresponding to the I image out of the data stored in the memories 17 and 18 are read out and are reproduced.

[5-3] Description of Operations at the Time of Rewind Play

At the time of rewind play, data read out of the video tape are alternately stored for each block in the memories 17 and 18, as at the time of reverse play. At the time of rewind play, however, only data corresponding to the I image out of the data stored in the memories 17 and 18 are read out in the opposite direction and are reproduced.

[B] Description of Second Embodiment

Referring now to FIGS. 10 to 16, description is made of an embodiment in a case where the present invention is applied to a digital VTR for recording and reproducing images picked up by a plurality of monitoring cameras.

[1] Description of Overall Configuration of Monitoring System

Figure 10:
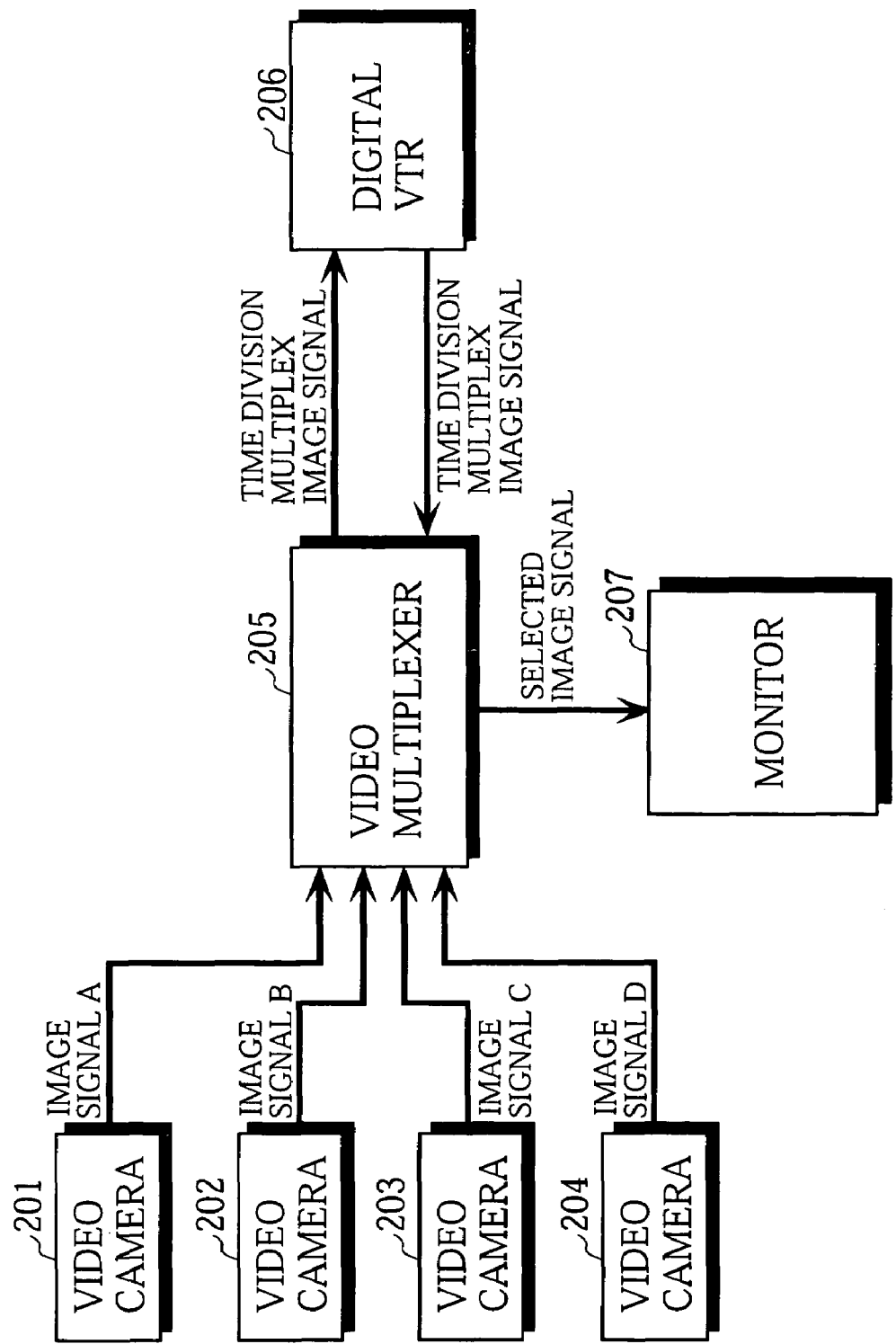
FIG. 10 is a block diagram showing the configuration of a monitoring system according to a second embodiment of the present invention.

FIG. 10 illustrates the overall configuration of a monitoring system.

The monitoring system comprises four video cameras (hereinafter referred to as monitoring cameras) 201 to 204, a video multiplexer 205 receiving image signals A to D respectively obtained by the monitoring cameras 201 to 204 as inputs to produce a time division multiplex image signal, a digital VTR 206 for compressing the time division multiplex image signal produced by the video multiplexer 205 for recording the compressed time division multiplex image signal on a video tape, and a monitor 207 for displaying an image selected by the video multiplexer 205 out of images included in the time division multiplex image signal reproduced by the digital VTR 206.

The video multiplexer 205 successively switches for each of the monitoring cameras 201 to 204 the image signals outputted for each field period so as to output the image signal A obtained by the monitoring camera 201 in one field period, output the image signal B obtained by the monitoring camera 202 in the succeeding field period, output the image signal C obtained by the monitoring camera 203 in the succeeding field period, and output the image signal D obtained by the monitoring camera 204 in the succeeding field period. Consequently, an image signal obtained by subjecting the image signals from the plurality of monitoring cameras 201 to 204 to time division multiplexing is referred to as a time division multiplex image signal.

Information such as camera numbers A, B, C, and D corresponding to the input image signals A to D obtained by the monitoring cameras 201 to 204 are respectively multiplexed on vertical blanking periods in corresponding fields in the time division multiplex image signal outputted from the video multiplexer 205. The information multiplexed on the vertical blanking period is referred to as a VBI signal.

The time division multiplex image signal outputted from the video multiplexer 205 is fed to the digital VTR 206. In the digital VTR 206, the fed time division multiplex image signal is compressed and is recorded on the video tape.

At the time of play, the video multiplexer 205 reads the VBI signal for each field from the reproduced output (the time division multiplex image signal) from the digital VTR 206, and judges whether or not an image in the field is an image signal to be presented on the basis of the camera number represented by the read VBI signal. When it is judged that the image is the image signal to be presented, the image in the field is preserved in an image memory in the video multiplexer 205. When images corresponding to a predetermined number of fields are stored in the image memory, the image is read out of the image memory, and is displayed by a monitor 207.

Figure 11:
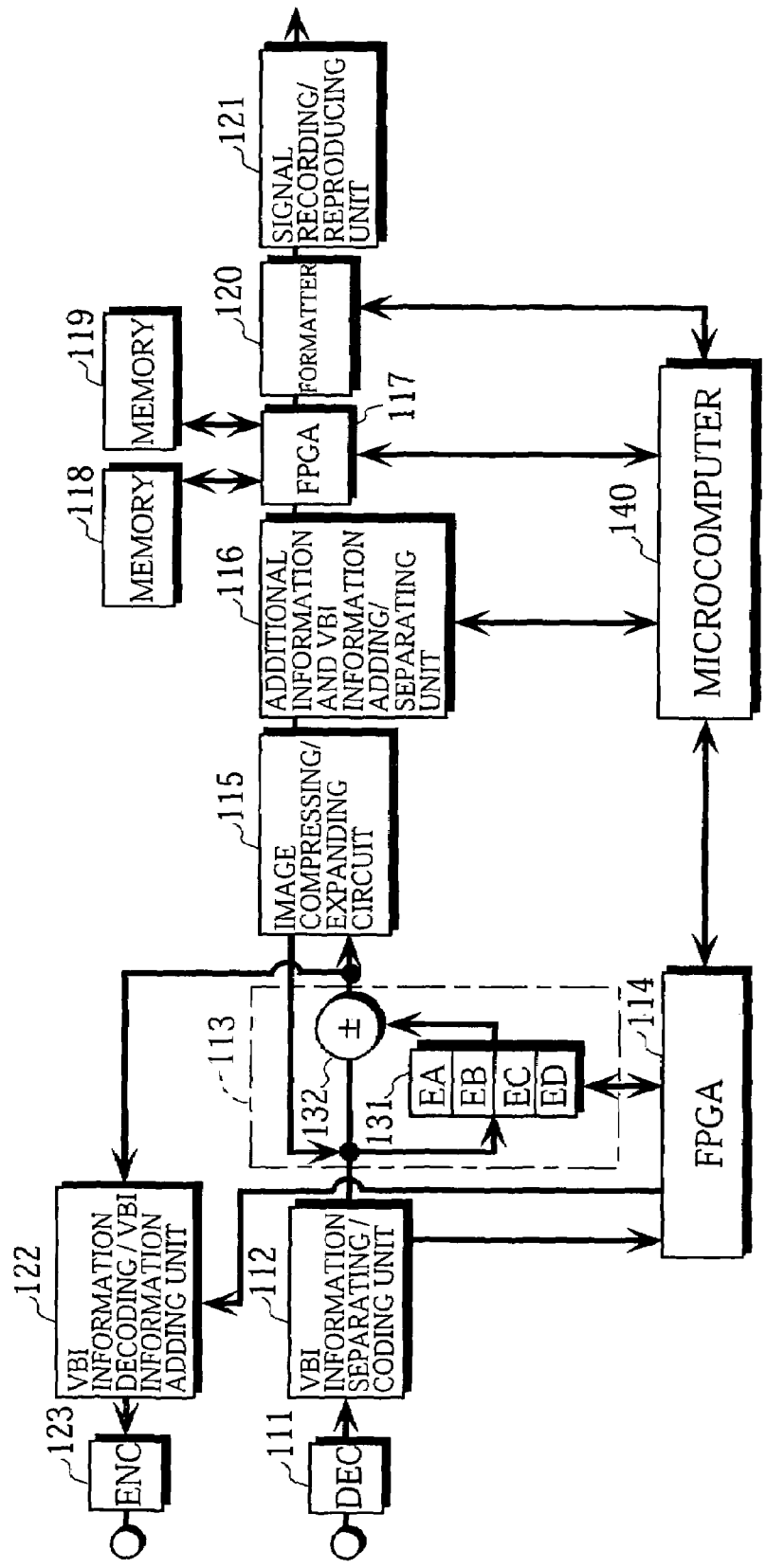
FIG. 11 is a block diagram showing the schematic configuration of a digital VTR.
Figure 14:
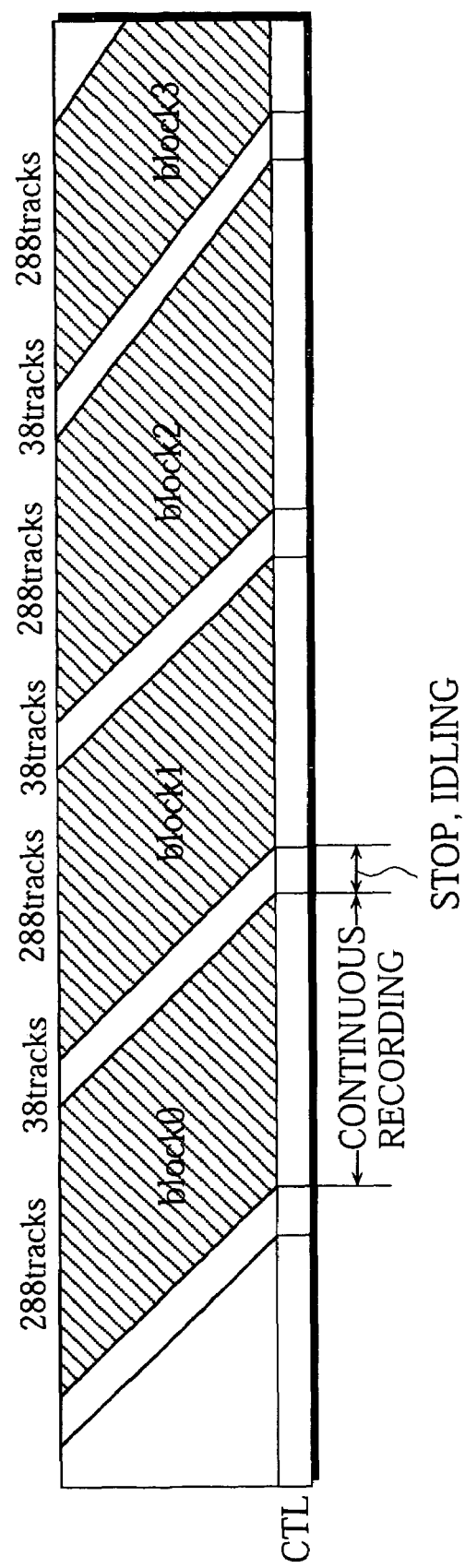
FIG. 14 is a schematic view showing that data are recorded on a video tape for each block.

[2] Description of Operation at the Time of Recording of Image Signal Processing Circuit in Digital VTR 206 FIG. 11 illustrates the configuration of an image signal processing circuit in the digital VTR 206.

At the time of recording, an analog image signal fed from the video multiplexer 205 is converted into digital image data by a decoder 111. The image data obtained by the decoder 111 is fed to a difference block 113 after VBI data is separated therefrom by a VBI information separating/coding unit 112.

The VBI information separating/coding unit 112 separates the VBI data from the image data fed from the decoder 111 to feed the separated VBI data to a first FPGA (Field Programmable Gate Array) 114, and codes the VBI data into a simpler form to feed the coded VBI data to the first FPGA 114.

FIG. 12 illustrates a specific example of the coding of the VBI data.

The VBI signal included in the time division multiplex image signal outputted from the multiplexer 205 is multiplexed on a vertical blanking period in each of the 10-th to 20-th horizontal lines, as shown in FIGS. 12 (a) and 12 (b). The VBI signal included in each of the horizontal lines is converted into 768 8-bit VBI data by the decoder 111.

The VBI information separating/coding unit 112 first slices the VBI data at a predetermined level, to convert the sliced VBI data into 768 1-bit data, as shown in FIG. 12 (c). The continuous eight data are added together, to produce 3-bit data, and the data is averaged by extracting only its most significant bit, as shown in FIG. 12 (d). That is, the eight data are converted into 1-bit data "0" if the sum of the eight data is 0 to 3 in decimal notation, while being converted into 1-bit data "1" if it is 4 to 8 in decimal notation. Consequently, 768 8-bit VBI data are converted into 96 1-bit coded VBI data.

The coded VBI data are decoded in the following manner. If the coded VBI data are "1", they are converted into eight data strings each composed of data "1". If the coded VBI data are "0", they are converted into eight data strings each composed of data "0". In such a manner, the coded VBI data are first converted into 768 1-bit data. Eight bits representing "0" are assigned to the data "0" out of the 768 1-bit data, and eight bits representing "255" are assigned to the data "1". Consequently, 768 8-bit VBI data are obtained.

The difference block 113 comprises a memory 131 and addition/subtraction means 132. The memory 131 is provided with four storage areas EA, EB, EC, and ED corresponding to the plurality of monitoring cameras 201 to 204, that is, corresponding to the four camera numbers A, B, C, and D. The memory 131 is controlled by the first FPGA 114.

FIG. 13 illustrates the operation at the time of recording of the difference block 113.

The first FPGA 114 decodes the camera numbers on the basis of the VBI data fed from the VBI information separating/coding unit 112, and judges the camera number corresponding to the field inputted to the difference block 113.

The first FPGA 114 stores, for each group of fields assigned the same camera number which are included in time division multiplex image data outputted from the VBI information separating/coding unit 112, image data as basic image data in the area EA, EB, EC, or ED corresponding to the camera number assigned to the group of fields in the memory 131 in a period of a predetermined number of fields (for example, in a period of six vertical periods), and feeds the image data to an image compressing/expanding circuit 115 through the addition/subtraction means 132.

In the group of fields assigned the same camera number which are included in the time division multiplex image data outputted from the VBI information separating/coding unit 112, each of the image data corresponding to the fields between the field corresponding to the image data which has been stored in the area EA, EB, EC, or ED corresponding to the camera number assigned to the group of fields in the memory 131 and the field corresponding to the image data which is to be subsequently stored in the corresponding area is fed to the addition/subtraction means 132, the difference between the fed image data and the basic image data which has been most newly stored in the corresponding area, and data representing the obtained difference is fed to the image compressing/expanding circuit 115.

In the example shown in FIG. 13, image data A1, B1, C1, and D1 obtained by the monitoring cameras 201 to 204 are respectively stored in the areas EA, EB, EC, and ED corresponding to the camera numbers in the memory 131, and are fed to the image compressing/expanding circuit 115.

Furthermore, the difference between each of the image data corresponding to the fields between the field corresponding to each of the image data A1, B1, C1, and D1 obtained by the monitoring cameras 201 to 204 which has been stored in the memory 131 and the field corresponding to the image data which is to be subsequently stored in the memory 131 and each of the image data having the same camera number out of the image data stored in the memory 131 is calculated, and data representing the obtained difference is fed to the image compressing/expanding circuit 115.

Image data (basic image data) which has been fed to the image compressing/expanding circuit 115 through the addition/subtraction means 132 is called I image data, and data (difference data) which has been fed to the image compressing/expanding circuit 115 after the difference thereof from the basic image data was found by the addition/subtraction means 132 is called P image data.

In the image compressing/expanding circuit 115, the image data fed from the difference block 113 is compressed by a JPEG system, for example, for each field. Compressed image data (coded data) obtained by the image compressing/expanding circuit 115 is fed to an additional information and VBI information adding/separating unit 116.

On the other hand, a microcomputer 140 acquires, from the first FPGA 114, I/P identification information indicating whether the compressed image data fed to the additional information and VBI information adding/separating unit 116 is I image data or P image data, a camera number corresponding to the compressed image data, and coded VBI information data, and feeds them, together with recording time information (information relating to the current year, month, day, minute, and second), to the additional information and VBI information adding/separating unit 116.

In the additional information and VBI information adding/separating unit 116, the additional information such as the I/P identification information, the camera number, and the recording time information, and the coded VBI data which correspond to the compressed image data fed from the microcomputer 140 are added to the compressed image data obtained by the image compressing/expanding circuit 115. The data to which predetermined data has been added by the additional information and VBI information adding/separating unit 116 is fed to a second FPGA 117.

The second FPGA 117 alternately writes the data fed from the additional information and VBI information adding/separating unit 116 into two memories 118 and 119 for each predetermined block including data corresponding to a plurality of fields, reads out, every time data corresponding to one block are written into the memory, the data from the memory into which the data corresponding to one block have been written, and feeds the data read out to a formatter 120. One block is composed of data corresponding to 288 tracks, including information relating to an audio in this example.

Specifically, the second FPGA 117 writes the data fed from the additional information and VBI information adding/separating unit 116 into one of the memories, for example, the first memory 118. When the data corresponding to one block have been written into the first memory 118, the memory into which the data are to be written is switched to the other second memory 119 and at the same time, the reading of the data from the first memory 118 is started.

The data read out of the first memory 118 is fed to the formatter 120. When the data corresponding to one block have been read out of the first memory 118, the reading is stopped.

Thereafter, when the data corresponding to one block have been written into the second memory 119, the memory into which the data are to be written is switched to the first memory 118 and at the same time, the reading of the data from the second memory 119 is started. The data read out of the second memory 119 is fed to the formatter 120. When the data corresponding to one block have been read out of the second memory 119, the reading is stopped. Thereafter, the same processing is repeated.

In the formatter 120, the fed data is converted into data having a data structure which can be recorded on the video tape. The data obtained by the formatter 120 is recorded on the video tape through a recording amplifier and a video head inside a signal recording/reproducing unit 121. That is, image data are recorded for each block (corresponding to 288 tracks) on the video tape. Every time the recording of the data for each block is terminated, the video tape is stopped. The video tape is stopped upon being idled by approximately 38 tracks after the stop is started.

The second FPGA 117 and the formatter 120 are controlled by the microcomputer 140.

[3] Description of Operation at the Time of Play of Image Signal Processing Circuit At the time of play, data are read for each block from the video tape by the video head inside the signal recording/reproducing unit 121. The read image data are fed to the second FPGA 117 through a reproducing amplifier inside the signal recording/reproducing unit 121 and the formatter 120.

The second FPGA 117 alternately writes the fed data into the two memories 118 and 119 for each block, reads out, every time the data corresponding to one block are written into the memory, the data from the memory into which the data corresponding to one block have been written, and feeds the data read out to the additional information and VBI information adding/separating unit 116.

In the additional information and VBI information adding/separating unit 116, the additional information such as a camera number, I/P identification information, and time information, coded VBI data, and so forth are separated from the fed data corresponding to one field. The data from which the additional information and so forth have been separated is fed to the first FPGA 114 through the microcomputer 140.

Data from which predetermined data has been separated by the additional information and VBI information adding/separating unit 116 is fed to the image compressing/expanding circuit 115, and is expanded for each field. Image data obtained by the image compressing/expanding circuit 115 is fed to the difference block 113.

Figure 15:
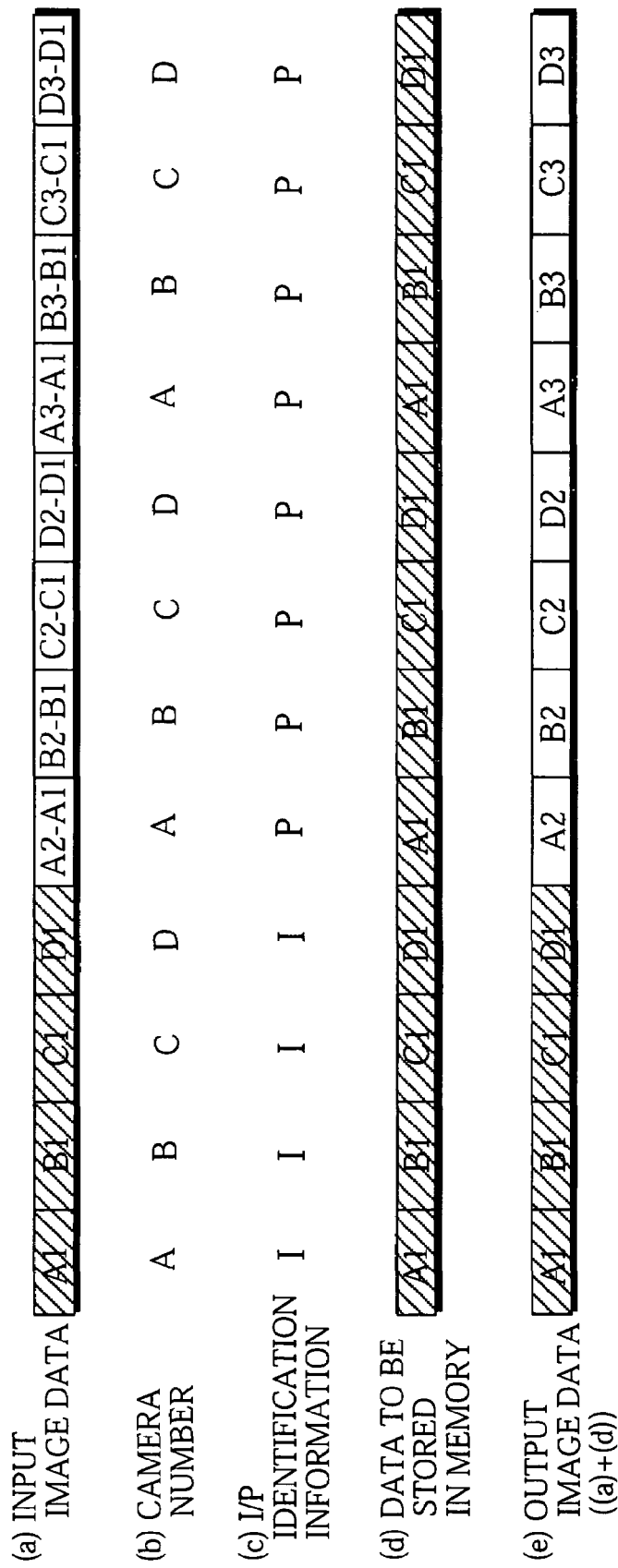
FIG. 15 is a timing chart showing the operation at the time of play of the difference block.

FIG. 15 illustrates the operation at the time of play of the difference block 113.

The first FPGA 114 judges, on the basis of the camera number fed from the microcomputer 140, the camera number corresponding to the field inputted to the difference block 113, and judges whether an image in the field inputted to the difference block 113 is an I image or a P image on the basis of the I/P identification information.

When the image in the field inputted to the difference block 113 is the I image, image data representing the I image is stored in the area EA, EB, EC, or ED corresponding to the camera number corresponding to the field in the memory 131, and is fed to a VBI information decoding/VBI information adding unit 122 through the addition/subtraction means 132.

When the image in the field inputted to the difference block 113 is the P image, data representing the P image (difference data) is fed to the addition/subtraction means 132, to find the sum of the P image data and the I image data (basic image data) which has been most newly stored in the area EA, EB, EC, or ED corresponding to the camera number corresponding to the field in the memory 131. Obtained image data is fed to the VBI information decoding/VBI information adding unit 122.

In the example shown in FIG. 15, I image data "A1", "B1", "C1", and "D1" are respectively stored in the areas EA, EB, EC, and ED corresponding to the camera numbers corresponding to the fields in the memory 131, and are fed to the VBI information decoding/VBI information adding unit 122.

Further, P image data "A2-A1", "B2-B1", "C2-C1", "D2-D1", etc. are respectively added to the I image data "A1", "B1", "$C_1$", and "D1" which are most newly stored in the areas EA, EB, EC, and ED corresponding to the camera numbers corresponding to the fields in the memory 131, to be returned to their original image data. Thereafter, the original image data are then fed to the VBI information decoding/VBI information adding unit 122.

To the VBI information decoding/VBI information adding unit 122, the coded VBI data separated by the additional information and VBI information adding/separating unit 116 is also fed from the first FPGA 114. The VBI information decoding/VBI information adding unit 122 decodes the coded VBI data fed from the first FPGA 114 in the above-mentioned method. To the image data fed to the VBI information decoding/VBI information adding unit 122 from the difference block 113, the VBI data, which has been decoded, corresponding to the image data is added.

The image data to which the VBI data has been added by the VBI information decoding/VBI information adding unit 122 is returned to an analog image signal by an encoder 123, and the analog image signal is then fed to the video multiplexer 205.

[4] Description of Error Processing at the Time of Play of Image Signal Processing Circuit At the time of play, an error may occur in image data read from the video tape by the video head. Description is made of a method of detecting the error and processing in a case where the error is detected.

Figure 16:
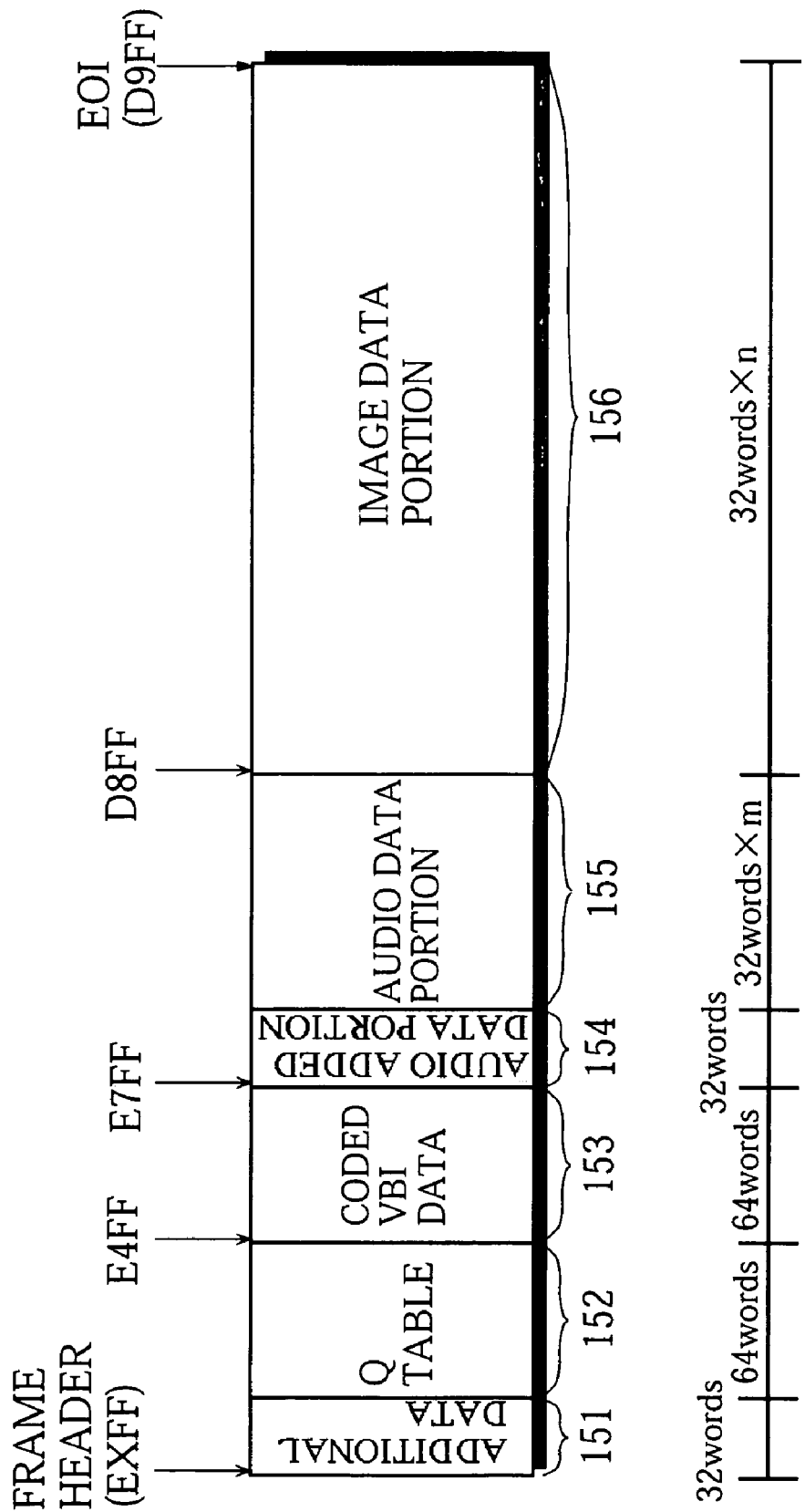
FIG. 16 is a schematic view showing a format for data corresponding to one field which is recorded on a video tape.

FIG. 16 illustrates a format for data corresponding to one field which is recorded on the video tape.

A data block corresponding to one field comprises a first header portion 151, a second header portion 152, a third header portion 153, an audio added data portion 154, an audio data portion 155, and an image data portion 156. The number of words composing each of the portions 151 to 156 is determined to be 32 words×k (k is an integer), as shown in FIG. 16, such that the first header portion 151 is composed of 32 words, the second header portion 152 is composed of 64 words, the third header portion 153 is composed of 64 words, the audio added data portion 154 is composed of 32 words, the audio data portion 155 is composed of 32×m (m is an integer of not less than one), and the image data portion 156 is composed of 32×n (n is an integer of not less than one). The audio added data portion 154 includes data representing m for defining the number of words composing the audio data portion 155.

The first header portion 151 includes additional information such as I/P identification information, recording time information (year, month, day, hour, minute, and second), and a camera number. "EXFFh", for example, is used as the I/P identification information, and is inserted as a frame header into the head of the first header portion 151. "h" in "EXFFh" indicates that "EXFF" is a hexadecimal number. An image in the image data portion 156 is an I image if "X" in "EXFF" is zero, while being a P image if it is one.

The second header portion 152 includes a quantization table (Q table). The third header portion 153 includes coded VBI data. A first error detecting header (for example, "E4FFh") is inserted into the head of the third header portion 153.

A second error detecting header (for example, "E7FFh") is inserted into the head of the audio added data portion 154. A third error detecting header (for example, "E8FFh") is inserted into the head of the image data portion 156. An end code (EOI; for example, "D9FFh") indicating the end of the image data portion is inserted into the end of the image data portion 156.

At the time of play, the second FPGA 117 writes the data fed from the formatter 120 into the memories 118 and 119 while confirming the frame header "EXFFh", the first error detecting header "E4FFh", the second error detecting header "E7FFh", the third error detecting header "D8FFh", and the end code "D9FFh" from the data fed from the formatter 120.

The second FPGA 117 starts to count the number of words when it detects the frame header "EXFFh" from the data fed to the second FPGA 117 from the formatter 120. When the counted number of words corresponds to the position where the first error detecting header "E4FFh" is inserted, it is confirmed whether or not the first error detecting header exists, to judge that an error occurred unless the first error detecting header can be confirmed.

In a case where the first error detecting header "E4FFh" can be confirmed when the counted number corresponds to the position where the first error detecting header is inserted, it is confirmed whether or not the second error detecting header "E7FFh" exists when the counted number corresponds to the position where the second error detecting header is inserted, to judge that an error occurred unless the second error detecting header can be confirmed.

In a case where the second error detecting header "E7FFh" can be confirmed when the counted number corresponds to the position where the second error detecting header is inserted, it is confirmed whether or not the third error detecting header "D8FFh" exists when the counted number corresponds to the position where the third error detecting header is inserted, to judge that an error occurred unless the third error detecting header can be confirmed.

The counted number corresponding to the position where the third error detecting header "D8FFh" is inserted is found by acquiring data representing m for defining the number of words composing the audio data portion 155 which is included in the audio added data portion 154.

The second FPGA 117 returns, when it is judged that an error occurred, a pointer to an address in which an end code (EOI) in the field preceding the field where it is judged that the error occurred has been written, to stop the writing of data into the memory until a frame header in the field succeeding the field where it is judged that the error occurred. When the frame header in the field succeeding the field where it is judged that the error occurred, the writing of the data into the field is started upon advancing the pointer by one position.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image recording apparatus for recording on a recording medium a time division multiplex image signal obtained by subjecting image signals from a plurality of video cameras to time division multiplexing and having information relating to the camera numbers of the video cameras respectively corresponding to fields included therein added thereto, comprising:

a plurality of basic image storage means respectively provided in correspondence with the camera numbers;

means for storing, for each group of fields assigned the same camera number which are included in the time division multiplex image signal, image data as basic image data in the basic image storage means corresponding to the camera number assigned to the group of fields in a period of a predetermined number of fields as well as feeding the image data as it is, to the image compression means;

means for finding, with respect to image data for each group of fields assigned the same camera number which are included in the time division multiplex image signal, the difference between each of the image data corresponding to the fields between the field corresponding to the image data which is stored in the basic image storage means and the field corresponding to the image data which is to be subsequently stored in the basic image storage means and the basic image data which has been most newly stored in the basic image storage means, and feeding data representing the obtained difference to the image compression means; and means for recording on a recording medium each of compressed data for each field which have been compressed by the image compression means, together with identification information indicating whether the compressed data corresponds to the basic image data or the difference data and the camera number.

2. An image reproducing apparatus for reproducing the data which has been recorded on the recording medium by the image recording apparatus according to claim 1, comprising:

means for reading the compressed data, the identification information, and the camera number from the recording medium;

image expansion means for expanding for each field the compressed data which has been read from the recording medium and returning the expanded compressed data to the data which has not been compressed by said image compression means;

means for judging whether the data for each field which has been expanded by the image expansion means is the basic image data or the difference data on the basis of the identification information;

means for storing, when the data for each field which has been expanded by the image expansion means is the basic image data, the basic image data in the basic image storage means corresponding to the camera number corresponding to the basic image data as well as outputting the basic image data as it is, as reproduced image data; and means for restoring, when the data for each field which has been expanded by the image expansion means is the difference data, the original image data on the basis of the difference data and the basic image data which has been most newly stored in the basic image storage means corresponding to the camera number corresponding to the difference data, and outputting the obtained image data as reproduced image data.

3. An image recording/reproducing apparatus comprising a recording apparatus for recording on a recording medium a time division multiplex image signal obtained by subjecting image signals from a plurality of video cameras to time division multiplexing and having information relating to the camera numbers of the video cameras respectively corresponding to fields included therein added thereto, and a reproducing apparatus for reproducing the data which has been recorded on the recording medium, wherein the recording apparatus comprises a plurality of basic image storage means respectively provided in correspondence with the camera numbers, means for storing, for each group of fields assigned the same camera number which are included in the time division multiplex image signal, image data as basic image data in the basic image storage means corresponding to the camera number assigned to the group of fields in a period of a predetermined number of fields as well as feeding the image data as it is, to the image compression means, means for finding, with respect to image data for each group of fields assigned the same camera number which are included in the time division multiplex image signal, the difference between each of the image data corresponding to the fields between the field corresponding to the image data which is stored in the basic image storage means and the field corresponding to the image data which is to be subsequently stored in the basic image storage means and the basic image data which has been mostly newly stored in the basic image storage means, and feeding data representing the obtained difference to the image compression means, and means for recording on a recording medium each of compressed data for each field which has been compressed by the image compression means, together with identification information indicating whether the compressed data corresponds to the basic image data or the difference data and the camera number, and the reproducing apparatus comprises means for reading the compressed data, the identification information, and the camera number from the recording medium, image expansion means for expanding for each field the compressed data which has been read from the recording medium and returning the expanded compressed data to the data which has not been compressed by said image compression means, means for judging whether the data for each field which has been expanded by the image expansion means is the basic image data or the difference data on the basis of the identification information, means for storing, when the data for each field which has been expanded by the image expansion means is the basic image data, the basic image data in the basic image storage means corresponding to the camera number corresponding to the basic image data as well as outputting the basic image data as it is, as reproduced image data, and means for restoring, when the data for each field which has been expanded by the image expansion means is the difference data, the original image data on the basis of the difference data and the basic image data which has been most newly stored in the basic image storage means corresponding to the camera number corresponding to the difference data, and outputting the obtained image data as reproduced image data.

* * * * *

UNITED STATES PATENT AND TRADEMARK OFFICE
CERTIFICATE OF CORRECTION

PATENT NO. : 6,983,101 B1
DATED : January 3, 2006
INVENTOR(S) : Yukio Sugimura et al.

It is certified that error appears in the above-identified patent and that said Letters Patent is hereby corrected as shown below:

<u>Title page,</u>
Item [75], Inventors, should read -- Yukio Sugimura (Osaka, Japan); Yoshiaki Maida (Osaka, Japan); Masanori Tokura (Osaka, Japan) --.

Signed and Sealed this

Twenty-eighth Day of March, 2006

JON W. DUDAS
*Director of the United States Patent and Trademark Office*